United States Patent
Bogren et al.

(10) Patent No.: US 10,023,995 B2
(45) Date of Patent: Jul. 17, 2018

(54) PROCESS AND A DISSOLVING PULP MANUFACTURED BY THE PROCESS

(71) Applicants: Södra Skogsägarna Ekonomisk Förening, Växjö (SE); Lenzing Aktiengesellschaft, Lenzing (AT)

(72) Inventors: Johannes Bogren, Göteborg (SE); Jim Parkås, Varberg (SE); Gabriele Schild, Seewalchen (AT); Andrea Borgards, Steinbach (AT)

(73) Assignee: SÖDRA CELL AKTIEBOLAG AB, Växjö (SE)

( * ) Notice: Subject to any disclaimer, the term of this patent is extended or adjusted under 35 U.S.C. 154(b) by 432 days.

(21) Appl. No.: 14/403,889

(22) PCT Filed: May 28, 2013

(86) PCT No.: PCT/EP2013/060926
§ 371 (c)(1),
(2) Date: Nov. 25, 2014

(87) PCT Pub. No.: WO2013/178608
PCT Pub. Date: Dec. 5, 2013

(65) Prior Publication Data
US 2015/0136346 A1   May 21, 2015

(30) Foreign Application Priority Data
May 28, 2012   (SE) ........................................ 1250540

(51) Int. Cl.
*D21C 9/00* (2006.01)
*D21C 3/04* (2006.01)
(Continued)

(52) U.S. Cl.
CPC ............... *D21C 9/004* (2013.01); *C08B 9/00* (2013.01); *C08H 8/00* (2013.01); *D21C 3/02* (2013.01);
(Continued)

(58) Field of Classification Search
CPC ......... D21C 9/005; D21C 9/004; D21C 3/045
See application file for complete search history.

(56) References Cited

U.S. PATENT DOCUMENTS 5,143,702 A * 9/1992 Der ................................ 162/29
5,676,795 A   10/1997 Wizani et al.
(Continued)

FOREIGN PATENT DOCUMENTS

CN   101457494 A   6/2009
CN   101484632 A   7/2009
(Continued)

OTHER PUBLICATIONS

Gullichsen editor, Chemical Pulping 6A, 1999, Fapet Oy,p. A616-A665.*
(Continued)

*Primary Examiner* — Anthony Calandra
(74) *Attorney, Agent, or Firm* — Ballard Spahr LLP

(57) ABSTRACT

The invention relates to processes for manufacturing pulp and more specifically to improved processes for manufacturing dissolving pulp. The processes have primarily been developed to be used in connection with large scale kraft processes, i.e. they have been designed to be incorporated into a plant. A liquor derivable from the process and comprising xylan, lignin, alkali and water is also disclosed as well as a dissolving pulp produced by the process.

18 Claims, 4 Drawing Sheets

(51) Int. Cl.
- *C08B 9/00* (2006.01)
- *D21C 3/02* (2006.01)
- *D21C 11/00* (2006.01)
- *C08H 8/00* (2010.01)
- *D21C 9/02* (2006.01)
- *D21C 9/18* (2006.01)
- *D21H 11/04* (2006.01)

(52) U.S. Cl.
CPC ............ *D21C 3/022* (2013.01); *D21C 3/045* (2013.01); *D21C 9/02* (2013.01); *D21C 9/18* (2013.01); *D21C 11/0007* (2013.01); *D21C 11/0057* (2013.01); *D21H 11/04* (2013.01)

(56) References Cited

U.S. PATENT DOCUMENTS

| | | | | |
|---|---|---|---|---|
| 2005/0203291 | A1* | 9/2005 | Svenson | C07H 3/02 536/124 |
| 2009/0312536 | A1 | 12/2009 | Sixta | 162/157.7 |

FOREIGN PATENT DOCUMENTS

| | | |
|---|---|---|
| WO | WO 1995/000698 | 1/1995 |
| WO | WO 1999/047733 | 9/1999 |
| WO | WO 2010/104458 | 9/2010 |
| WO | WO 2011/138633 | 11/2011 |
| WO | WO 2011/138634 | 11/2011 |

OTHER PUBLICATIONS

Gullichsen editor, Chemical Pulping 6B, 1999, Fapet Oy,p. B150-B172.*

Rydholm, Pulping Processes, 1965, Interscience Publishers,p. 799-800 and chapter 15.*

Gehmayr et al., Dissolving Pulps from Enzyme Treated Kraft Pulps for Viscose Application, 2011, Lenzinger Berichte, 89, p. 15-160.*

Garrote et al., Effects of Eucalyptus globulus Wood Autohydrolysis Conditions on the reaction Products, 2007, Journal of Agirculatural and Food Chemistry, 55, 9006-9013.*

"Alkaline extraction" in: The Bleaching of the Pulp, Morris Wayman 67-103, 1963.

"Characterization of the liquors" in: Chemical Pulping, Gullichsen & Paulapuro (eds.), B136-B138, 1999.

International-Type Search Report dated Feb. 14, 2013 for Application No. 1250540-0, which was filed on May 28, 2012.

International Search Report dated Aug. 2, 2013 for PCT/EP2013/060926, which was filed on May 28, 2013 and published as WO 2013/178608 on Dec. 5, 2013. (Inventor—Bogren; Applicant—Södra Cell AB) (pp. 1-3).

* cited by examiner

A sample obtained according to the present method

A reference sample

PROCESS AND A DISSOLVING PULP MANUFACTURED BY THE PROCESS

CROSS-REFERENCE TO RELATED APPLICATIONS

This application is a U.S. National Phase Application of International Application No. PCT/EP2013/060926, filed on May 28, 2013, which claims priority to Swedish Patent Application No. 1250540.0, filed May 28, 2012, each of which are hereby incorporated by reference in their entirety.

TECHNICAL FIELD

The present invention relates to processes for manufacturing pulp and more specifically to improved processes for manufacturing dissolving pulp. The processes have been developed to be used in connection with large scale kraft processes, i.e. they have been designed to be incorporated into a plant. A liquor comprising xylan, lignin, alkali and water is also disclosed as well as a pulp and a semi-purified pulp and possible uses for these pulps.

BACKGROUND

Dissolving pulp, also known as dissolving cellulose, is a bleached wood pulp that has a high cellulose content and is produced chemically from the wood by using a sulfite process or a kraft process. The kraft process is a commonly used pulping process and in a conventional kraft process, wood is treated with an aqueous mixture of sodium hydroxide and sodium sulfide. This treatment degrades and solubilizes lignin leading to a defibration of the wood fibers.

Furthermore, conventional manufacturing of dissolving pulps by kraft processes, such as kraft processes comprising a prehydrolysis step, suffer from low yields as the hemicelluloses in the wood are degraded during the process, mainly in the prehydrolysis step and are transferred into an acid condensate as low-molecular weight hemicellulose, monosaccharides and hemicellulose degradation products. Due to difficulties in extracting these degradation products from the digester, the degraded material is at best used for energy production by evaporation and burning of the components or else simply discarded as waste.

WO 99/47733 discloses a process for producing cellulosic fibers, wherein the degree of polymerization of the obtained fibers can be adjusted via acid hydrolytic and oxidative degradation. However, the kraft pulp obtained by this process has high amounts of residual hemicelluloses, which makes the obtained pulp less useful for the production of regenerated cellulose for use in e.g. textile applications as these residual compounds have a negative impact on the process behavior and, as a result thereof, also on the textile-mechanical properties of the fibers produced therefrom.

US 2009/0312536 discloses a process for producing dissolving pulp suitable for textile applications from a cellulosic starting material using a kraft process which has been combined with a purification step of cold caustic extraction (CCE) type. The processes disclosed in US 2009/0312536 are not optimized for implementation in a kraft pulp mill, i.e. in an industrial scale process.

Both WO2011/138633 and WO2011/138634 disclose methods for pulp processing including a cold caustic extraction step. However, the disclosed methods describe costly procedures having a low total yield of dissolving pulp.

Accordingly, it is an object of the present disclosure to provide an improved industrial scale process for producing high yield dissolving pulp in an efficient and economical manner.

SUMMARY

The present invention provides improved processes for manufacturing dissolving pulp comprising a cold caustic extraction (CCE) step in the commonly used kraft process. The processes are highly suitable for use in a plant or a mill, i.e. in industrial (large) scale processes and reduces the drawbacks of previously known processes.

Hence, the present disclosure relates to a process for manufacturing dissolving pulp comprising the steps of:
a) selecting a wood based raw material, wherein said wood based raw material has a xylan content of from 12 weight % or more;
b) adding a cooking liquor comprising white and/or black liquor to the wood based raw material;
c) digesting the wood based raw material composition obtained from step b) in a kraft cooking process;
d) oxygen delignifying the pulp obtained from step c);
e) adding industrial white liquor with high ionic strength to the pulp obtained from step d), wherein said pulp has a xylan content of 8 weight % or more and wherein the temperature is lowered and kept at 65° C. or lower for 5 minutes or more and wherein the alkali concentration in the liquid phase of the obtained pulp suspension is in the range of from 70 g/l to 100 g/l;
f) removing 90% or more of the alkali and dissolved xylan as a liquor flow from the pulp obtained from step e) by dewatering the pulp; and
g) subjecting the pulp to washing and pressing in a washing press device 1-5 times.

By using an unconventionally high alkali concentration in step e), it is possible to introduce industrial white liquor having high ion strength into the process and still obtain high quality dissolving pulp. Accordingly, the processes disclosed herein offer economically viable industrial-scale production methods.

Removal of xylan from pulp after using cold caustic extraction (CCE), as opposed to prehydrolysis, yields alkaline liquor comprising a high concentration of high-molecular weight xylan, such liquor may be used as it is, or the xylan may be isolated therefrom. The processes disclosed herein make it possible to obtain value-added products from the xylan removed during the process for manufacturing dissolving pulp. A further advantage is that the total obtained yield of dissolving pulp is higher in processes comprising a CCE-step than for processes using a prehydrolysis-kraft process.

In previously known dissolving pulp processes, the CCE-step is carried out at low temperatures such as 20° C. to 30° C. and with reaction times in the order of 30-60 minutes. It has now been shown that the CCE-step in a process in accordance with the invention may be carried out at considerably higher temperatures allowing shorter reaction times. The use of more severe production conditions makes the process disclosed herein better adapted for industrial scale production as it reduces production time and costs for cooling and reheating process fluids between the different process steps. Accordingly, the CCE-step in the process of the invention may be carried out at a temperature as high as 65° C., such as from 50° C.-60° C. and at reaction times down to 5 minutes such as from 5 minutes to 15 minutes. No deterioration in pulp quality due to the changes in reaction conditions was observed.

Accordingly, the process of the invention has been developed for use in a plant or a mill, i.e. in an industrial environment. The process is highly suitable for integration into a kraft process for manufacturing pulp and is specifically adapted for use under the harsh conditions existing in industrial scale mill production using high ionic-strength liquids obtained from industrial processes as opposed to the more ideal conditions and liquors that can be used in lab-scale processes where cost restrictions are of less importance. As will be shown herein, this difference has a large impact on both the process and process conditions. The wood based raw material used in the process disclosed herein may be of any commonly used physical form, such as chips, saw dust or shavings.

The process may comprise a combined depolymerization and bleaching step, wherein the pulp is bleached and the viscosity of the pulp is reduced.

The white liquor used in the process is of industrial origin, i.e. it is obtained in the mill and comprises $Na_2CO_3$, NaHS and NaOH. The presence of these different sodium compounds in the liquor means that the liquor used in the CCE-step e) has very high ionic strength. A high ionic strength liquor would normally be expected to affect the CCE-step in a negative way as the content of xylan in the resulting pulp would be higher than desired in a dissolving pulp. However, the process as defined herein overcomes this problem, as it has surprisingly been found that this problem can be fully or partly solved by increasing the alkali concentration in the CCE-step e). The effects of a high ionic strength process liquid may be further mitigated by decreasing the temperature and/or by performing a steam activation step before the kraft cooking process.

A practical upper limit for the alkali concentration in the liquid phase of the pulp suspension in the CCE-step e) may be approximately 95 g/l. In a process having a wash-press step before the CCE-step e) with a dry solids content after the wash-press step of 30%, the amount of alkali in the liquid phase of the pulp suspension when using a 117 g/l white industrial liquor will be up to 83 g/l at a pulp concentration of 10%. This means that the liquid which is removed by the dewatering step f) will have an alkali content in this order. As a comparison, in a conventional process for producing dissolving pulp the amount of alkali in the liquid phase of the pulp suspension is only up to 33 g/l.

The pulp consistency can be lowered to allow a higher alkali concentration but then the white liquor need would increase which is negative from a process economy point of view as it would involve using more white liquor, larger vessels, larger process flows, etc. It may be advantageous if alkali streams coming from upstreams of the CCE-step are used in the washing step preceding the CCE-step as this will mean that the pulp is alkaline when entering the CCE-step.

Further, the white liquor added in step e) may have a suspended solids content of 20 mg/l or less, such as 10 mg/l or less, such as 5 mg/l or less, such as 1 mg/l. The suspended solids content in the white liquor is measured according to Tappi 692 om-08. It has been found that keeping the suspended solid content below 20 mg/l will provide a pure pulp with low metal ion content. The solid content measurement may be performed after the final clarification, i.e. the final sedimentation or after filtration of the white liquor. The sedimentation may be performed by, but not limited to, using a sedimentation vessel and the filtration may be performed by, but not limited to, using a filter.

The present disclosure also relates to a liquor obtainable from the CCE-step of the process and comprising xylan, water, lignin and alkali, wherein the xylan/lignin ratio is from 2:1 to 20:1, such as from 3:1 to 15:1, such as from 4:1 to 10:1, such as from 4.5:1 to 8:1, such as 6:1.

The present disclosure also relates to a pulp obtainable from the process and having a kink of from 1.3 to 2.0 kinks/mm and a shape factor of from 70 to 82% and to a pulp obtained by the processes as defined herein.

Furthermore, the present disclosure also relates to use of a pulp as defined herein for the manufacture of cellulosic products, in particular according to the lyocell process, the modal process or the viscose process.

Definitions

As used herein the term "white liquor" implies a high ionic strength industrial white liquor i.e. white liquor comprising NaOH, NaHS and $Na_2CO_3$.

The term "dissolving pulp", as used herein, is intended to define a pulp having high cellulose content and low content of lignin and hemicellulose. The dissolving pulps are classified depending on their content of alpha-cellulose. Depending on the applications, different content of alpha cellulose is required.

The term "P-factor" describes the intensity of the activation step. The calculation and further details are described in, for example, the "Handbook of Pulp", vol. 1, Wiley-VCH 2006, pp. 343-345.

The term "kraft cooking" refers to a cooking process, wherein a wood based raw material is inserted into an appropriate vessel or tank (e.g. a digester), a cooking liquor is added to the wood based raw material and cooking is performed by raising the temperature to a cooking temperature, such as between 140 to 180° C., which is maintained for a sufficient time for delignification to occur, e.g. up to 3 hours. The active cooking chemicals are hydroxide and hydrosulfide ions which react and degrade lignin. The objective of the kraft cooking step is to free the fibers and separate them from each other.

The terms "mill" or "plant" are used interchangeable herein and refer to a manufacturing facility that converts wood based raw material such as but not limited to wood chips to wood based products such as dissolving pulp or pulp.

The expression "filtrate operation method", as used herein, refers to methods for reducing the amount of fresh water needed in a washing process. One method to achieve reduced fresh water consumption in a washing process is by recirculating the filtrate from a downstream washing step and use it as a washing liquid in an upstream washing step.

As used herein, the term "hemicellulose" includes different carbohydrates such as, but not limited to, xylan and (galacto)glucomannan.

As used herein, the term "xylan" is intended to include arabinoglucuronoxylan and glucuronoxylan as well as xylan originating from these two.

As used herein, the expression "industrial scale process" is intended to mean a process which is carried out on a large scale, i.e. a process which makes it economically feasible for society to use the material obtained by the process on a large scale. An industrial scale process is distinguished from small scale processes, such as laboratory scale processes, pilot plant processes, etc. where cost considerations and other conditions are different from those governing industrial production.

As used herein, the term "alkali" refers to the basic hydroxide ion. The hydroxide ion is present in different compounds such as, but not limited to, NaOH and KOH. In the present context, the concentration of alkali is always presented as NaOH regardless of counter ion. In this disclosure, this is determined by titration of a sample of the liquor with strong acid to the first inflexion point in the procedure specified in SCAN-N 2:88. "The terms effective alkali and alkali are used interchangeably".

The term "lignin" refers to the wood component lignin or any components found in pulp or in liquors originating from lignin.

The term "intrinsic viscosity" as used herein, refers to the viscosity of dissolved pulp in a Copper Ethylene Diamine solution according to ISO 5351:2010.

Xylan was precipitated from the liquid phase of the obtained pulp suspension at acidic conditions following the protocol for beta-cellulose isolation according to Tappi T 203 om-93: 1993. The molecular weight distribution of the recovered xylan was measured by size exclusion chromatography (SEC) with multiangle light scattering (MALLS) detection in LiCl/DMAc (dimethylacetamide) solution according to Schelosky et al., 1999 (Das Papier 53:728-738).

The term "kappa number" as used herein, is an indication of the residual lignin content or bleachability of wood pulp by a standardized analysis method. The kappa number is determined by ISO 302:2004. The kappa number is a measurement of standard potassium permanganate solution that the pulp will consume. The measurement is inflated by the presence of hexenuronic acids in the pulp. These compounds are formed during the chemical pulping process, from the hemicelluloses. The kappa number estimates the amount of chemicals required during bleaching of wood pulp to obtain a pulp with a given degree of whiteness. Since the amount of bleach chemicals needed is related to the lignin content of the pulp, the kappa number can be used to monitor the effectiveness of the lignin-extraction phase of the pulping process.

As used herein "cellulose II" refers to the more thermodynamic favored allomorph of cellulose as determined by $^{13}$C NMR. The method for measuring the content of cellulose II is described in Wollboldt et al. 2010 (Wood Science and Technology, 44, 533-546). The % values with regard to this disclosure should always be understood as given as weight % on cellulose.

The term "kink(s)" refers to the local directional changes of greater than 30° in fibers. In order to be recognized as a kink, the distance between two deformations must be at least 200 µm, the unit used is kinks/mm. Kinks are measured using image analysis of the fibers and a L&W Fiber Tester—code 912 has been used in the analyses in the present disclosure.

The term "WRV" as used herein means water retention value and is defined and analyzed according to ISO 23714: 2007. The WRV-values herein have been obtained in analyses of once-dried pulp samples.

The term "shape factor" refers to the ratio of the maximum extension length of the fibre (projected fiber length) to the true length of the fibre (along the fibre contour) here expressed in %. Shape factor is thus I/L×100 where I is the projected length and L is the true length. The shape factor is measured using image analysis of the fibers and a L&W Fiber Tester—code 912 has been used in the present analyses.

The term "lateral fibril aggregate dimension" or "LFAD" refers to the dimension of the cellulose fibril aggregates as calculated from data received by cross polarization-magic angle spinning (CP-MAS) $^{13}$C NMR spectroscopy. The method used followed that described in Wollboldt et al. 2010 (Wood Science and Technology, 44, 533-546).

Hence, the present disclosure relates to a process for manufacturing dissolving pulp comprising the steps of:
a) selecting a wood based raw material, wherein said wood based raw material has a xylan content of from 12 weight % or more;
b) adding a cooking liquor comprising white and/or black liquor to the wood based raw material;
c) digesting the wood based raw material composition obtained from step b) in a kraft cooking process;
d) oxygen delignifying the pulp obtained from step c);
e) adding white liquor to the pulp obtained from step d), wherein said pulp has a xylan content of 8 weight % or more and wherein the temperature is lowered and kept at 65° C. or lower for 5 minutes or more and wherein the alkali concentration in the liquid phase of the obtained pulp suspension is in the range of from 70 g/l to 100 g/l; and
f) removing 90% or more of the alkali and dissolved xylan as a liquor flow from the pulp obtained from step e) by dewatering the pulp; and
g) subjecting the pulp to washing and pressing in a washing press device 1-5 times.

According to the process as defined herein, step e) may be performed at a temperature of 60° C. or lower, such as at a temperature of 55° C. or lower, such as at a temperature of 50° C. or lower. Additionally, step e) may also be performed in the temperature range of from 25 to 65° C., such as in the temperature range of from 30 to 60° C., such as in the temperature range of from 35 to 55° C., such as in the temperature range of from 25 to 50° C., such as in the temperature range of from 30 to 50° C. According to the process as defined herein, the temperature of step e) may be lowered at the same time as the white liquor is added or it may be lowered in steps, i.e. the temperature may be lowered before the white liquor is added and then lowered further after the white liquor is added.

The xylan content of the pulp obtained from step c) and used in step d) may be of from 8 to 35 weight %, such as from 10 to 30 weight %, such as from 14 to 28 weight %.

Further, the treatment of step e) may be performed for 5 minutes or more, such as from 5 minutes to 3 hours, such as from 5 minutes to 1 hour, such as from 5 minutes to 0.5 h, such as from 5 minutes to 15 minutes.

According to the process as defined herein, said wood based raw material may have a xylan content of from 12 weight % to 35 weight %, such as from 12 weight % to 30 weight %.

The alkali concentration of step e) may be in the range of from 75 to 100 g/l, such as in the range of from 80 to 100 g/l, such as in the range of from 85 to 100 g/l, such as in the range of from 90 to 100 g/l, such as in the range of from 95 to 100 g/l. The alkali concentration may be measured by using the method described in SCAN N-30:85, i.e. using potentiometric titration.

Furthermore, the cooking liquor:wood based raw material ratio in the digester may be from 2:1 to 6:1, such as 3:1 to 6:1, such as from 3.5:1 to 5.5:1, such as from 4:1 to 5:1, such as from 4.5:1 to 5.5:1, such as from 4:1 to 6:1.

Additionally, the process as defined herein may comprise a washing step after step d), i.e. between the oxygen delignifying step d) and the CCE-step e) such step comprising washing the pulp obtained from step d) in a washing device. Examples, but not limited to, of washing devices are wash presses, screw presses and wash filters, as known in the art.

According to the process as defined herein, the xylan and alkali removed by step f) may be fully or partly recirculated as a liquor flow and used as an alkali source in step d). Optionally, the liquor flow from step f) may be oxidized before being used in step d). Oxidation may be performed by supplying oxygen either as oxygen gas or as air using methods known to the skilled person. Recirculation of process liquor from step f) having high alkali concentration has the advantage that substantially no external alkali has to be added to the process in step d) as the recycled and reused process liquor contains a sufficient or close to sufficient amount of alkali to meet the process requirements of step d). Furthermore, all or a part of the liquor flow from step f) may be used in another process for pulp manufacturing such as in a parallel manufacturing process in the same production plant. With the process as disclosed herein, it is possible to obtain a highly concentrated process liquor from the dewatering-step f) following directly on the CCE-step e). The liquor from the dewatering-step f) has a high xylan content as well as a high alkali concentration. This means that when said liquor flow is used as an alkali source in another process for manufacturing pulp, the alkali concentration in the other process can be maintained in the range of from 60 to 90 g/l without any supplementary addition of alkali. Preferably, the liquor flow is added at a late stage of the cooking step in the parallel process and is regulated so that the amount of residual alkali in the outgoing process flow from the digester is low.

In accordance with the present method, 90% or more, such as 95% or more, of the alkali and/or xylan may be removed from the pulp obtained from the CCE-step e) in the dewatering step f) and the washing step g).

A major part of the alkali and xylan is removed from the pulp already by the dewatering step f). As step f) involves dewatering the pulp from the CCE-step e) without diluting the filtrate with a washing liquid, the process liquid which is obtained from the dewatering step has the same high xylan and alkali content as the liquid phase in the CCE-step e).

The dewatering step f) and the washing step g) may be followed by a filtering step wherein the pulp is filtered in a wash filter.

The dewatering step follows directly on the CCE-step and the liquor removed from the pulp by dewatering has a very high content of xylan and alkali and can be used directly for recycling or to supplement the process liquid in a parallel pulp production process without further concentration or purification steps. Furthermore, the high xylan content in the liquor from the dewatering step makes the liquor highly suitable for further processing and as a xylan source. The dewatering step may include pressing, the application of vacuum, use of a centrifuge and the like.

The process as defined herein may comprise an additional step before addition of the cooking liquor in step b), which additional step comprises activation of the wood based raw material using steam until reaching a P-factor of from 0 to 200, such as from 25-200, or from 50-100.

Furthermore, the process may comprise a step after dewatering, washing and optionally filtering the pulp, which step is a combined depolymerization and bleaching step. The combined depolymerization and bleaching step may be performed by adding ozone or by adding hypochlorite or by adding chlorine dioxide and sulfuric acid. The step may be performed by first adding chlorine dioxide to the pulp and then adding sulfuric acid or by first adding sulfuric acid to the pulp and then adding chlorine dioxide, i.e. said addition may be performed sequentially in any order. An advantage with the method disclosed herein is that the pulp is comparatively easy to depolymerize, implying that the depolymerization step may be carried out at relatively mild conditions requiring less addition of acid, etc.

The combined depolymerization and bleaching step may be performed at a temperature of from 80 to 99° C. and at an effective acid charge of from 5 to 20 kg $H_2SO_4$/ADT. In the present disclosure, the "effective acid charge" means the amount of sulphuric acid charged in kg/ton, i.e. it does not include the amount sulphuric acid needed for neutralization, at 10% pulp consistency. If other pulp consistencies are used the acid charge must be adjusted accordingly.

After the combined bleaching and depolymerization step, the obtained semi-purified pulp may contain 6 weight % xylan or less, such as from 2 to 6 weight %.

The present disclosure also relates to a liquor comprising xylan, water, lignin and alkali, wherein the xylan/lignin ratio is from 2:1 to 20:1, such as from 3:1 to 15:1, such as from 4:1 to 10:1, such as from 4.5:1 to 8:1, such as 6:1. The xylan/lignin ratio is the weight ratio between the two components in liquors using the two defined analyses which are disclosed herein, respectively. The liquor is obtainable from the dewatering step f) of the process as set out herein. A liquor having particularly high concentrations of xylan and alkali is obtained in the dewatering step f) following directly on the CCE-step e), as disclosed herein. It has surprisingly been found that xylan obtained from the process disclosed herein has a higher average molecular weight than xylan that may be obtained from previously known processes. Accordingly, the liquor obtained from the dewatering step f) may comprise xylan having an average molecular weight of from 15 to 40 kg/mol, such as from 20 to 35 kg/mol. A high molecular weight of the obtained xylan is particularly beneficial when the liquor obtained from the dewatering step f) is used as a process liquid in a papermaking process. A higher proportion of the added xylan will then be deposited on the pulp fibers in the papermaking process than what can be achieved with the lower molecular weight xylan that can be obtained from a conventional dissolving pulp process.

The present disclosure also relates to a process for manufacturing pulp comprising a kraft process parallel to the dissolving pulp process as disclosed herein, wherein the liquor obtained from step f) of the process as defined herein is added to the kraft cooking process in a way that the alkali may be consumed while keeping the liquor in the digester until the end of the cooking process and wherein the residual alkali concentration may be from 5 to 15 g/l. Accordingly, 80% or more of the alkali needed for the digestion of the wood based raw material in said process may be obtained from a process as defined herein.

In order to provide a good result in the CCE-step e), the chemical composition of the wood should include 12 weight % or more of xylan in addition to lignin and cellulose. Examples of such wood species are hardwoods, such as wood from birch, beech, aspen and eucalyptus. Birch, beech and aspen are particularly rich in xylan, while eucalyptus wood commonly used in pulping processes has somewhat lower xylan content. Wood species which are less suitable for use in alkali based pulp process such as the dissolving pulp processes disclosed herein are various conifers, such as spruce and pine. However, these wood species may be used, e.g. in a linked process for manufacturing pulp which may be located in the same mill. Accordingly, in a linked or parallel process, the wood source may comprise any of the wood species mentioned above as precipitation of the alkaline soluble hemicellulose may occur on wood fibers of any origin.

The washing step g) comprising one or more washing devices comprised in a process as defined herein may be performed accordingly: The pulp is first dewatered by passing the pulp through a press device wherein no dilution of the filtrate from the CCE-step e) by washing liquid is performed, implying that no liquid is added to the pulp. Thereafter the pulp is passed through two washing press devices wherein washing is performed, preferably followed by a wash filter. The washing may be performed according to a washing method as described. The washing may be performed in a countercurrent operation as is common in the art. Counter-current washing means that fresh water is added to the last washing device and that the wash liquid from a downstream wash step is used in an upstream wash step. In this manner, the fresh water is efficiently used and the risk of alkali carryover from one step to the next step is minimized.

The process as defined herein has surprisingly been technically proven to yield good results without a vapour activation step, i.e. at P-factor 0. However, if desired, the process may comprise a pretreatment step before adding the cooking liquor in step b), which pretreatment step comprises activation of the wood based raw material by using steam. The pretreatment of the wood based raw material comprises treating the wood based raw material with steam at a temperature in the range of from 150 to 180° C. before the kraft cooking step b) in order to facilitate impregnation of the wood based raw material and to prepare the wood based raw material for the cold caustic extraction step e). After the steam treatment of the wood based raw material, a conventional kraft cooking process is performed. If a condensate has been produced in the vessel used for the steam treatment, e.g. a digester, it may be advantageous to remove the condensate so that the quality of the pulp is not impaired by wood residues remaining in the condensate. As the condensate is acidic, white liquor may be used to remove the condensate. If a digester is used as a vessel for the steam treatment, the same vessel may subsequently be used for the kraft cooking process.

In the process defined herein the CCE-step e) will remove most of the xylans from the pulp. Hence, after the CCE-step, the obtained pulp may contain 6 weight % or less of xylan such as 2-6 weight % of xylan. The alkali concentration measured as effective alkali in the CCE-step e) is kept above 90 g/l when the P-factor is from 0 to 10 and is kept in the range from 75 to 90 g/l when the P-factor is from 11 to 200. The pulp consistency may be from 8 to 12 weight % and the residence time is at least 5 minutes, such as from 5 to 30 min.

The viscosity of the pulp will be decreased when applying a combined bleaching and depolymerization step. Depending on the target viscosity, the acidic charge may be from 5 to 20 kg $H_2SO_4$/ADT and the temperature may be kept at from 80 to 99° C. The residence time in the down flowing tower is accurately controlled so that the target viscosity can be obtained. This combined step has the advantage of decreasing the viscosity of the pulp and at the same time increasing brightness of the pulp. The heating of this step may be performed by steam. The advantage of using steam and adding chlorine dioxide before or after the addition of $H_2SO_4$ is that any $HS^-$ (hydrogen sulfide) left in the pulp will react with the chlorine dioxide and form sulfate. Hence, the reaction between acid and $HS^-$, which will provide $H_2S$, is avoided. This step may be performed by using an up-flowing tower as the chlorine dioxide is in a gaseous form. In order to control the viscosity of the pulp, it may be transported through a tower with a down-flowing stream.

When the viscosity has been adjusted, a final brightness of the pulp of above 85% ISO may be obtained by performing a separate bleaching step. When all the specification of a dissolving pulp is met, the dissolving pulp can either be dried and sold as market pulp or be directly transferred to an integrated converting plant.

The alkali and xylan removed after the CCE-step may be used in another kraft process for manufacturing pulp, said process may be linked to the process as defined herein and may be in the same plant. One possibility to link said processes is by using a pipe, the pipe is then transporting the liquor from one process to the other. The effective alkali concentration of the transferred liquor is preferably high enough to supply the linked process with the alkali charge needed or at least with a major part of the needed alkali charge. This requirement may be fulfilled by using the washing method as disclosed above, i.e. to use a press device directly after the CCE-step instead of a conventional wash press which dilutes the filtrate. To maximize the amount of precipitation of hemicellulose onto the wood fibers to be treated in the linked process, the liquor from the process as defined herein is added to the linked process after the completion of the impregnation of the wood material so that said liquor will become the residual cooking liquor and so that said liquor will not be displaced before precipitation has occurred.

The use of the liquor from the wash-step e) in a linked process will provide good process economy as the yield from the linked process can be increased which results in better process economy and the mechanical properties of the resulting paper pulp obtained from the linked process are improved by the increased xylan content. The ratio between the production speed in the two processes should be in the order of 1:1.5 or 1:2 (dissolving pulp:paper pulp) for optimal process economy and correct alkali balance.

If the dissolving pulp obtained by a process as defined herein is intended for use in a lyocell process, the dissolving pulp should be pure in terms of high cellulose content and a low content of metal ions and should have a narrow molecular weight distribution. However, if the dissolving pulp obtained by a process as defined herein is intended for use in viscose processes, the reactivity and the filterability of the pulp are the most important parameters. The reactivity of the dissolving pulp may be improved by performing steam activation of the wood based raw material before kraft cooking process and a P-factor of 50 and above may be preferred. In case of production of dissolving pulp for solvent processes the P-factor should be minimized to such extent that the steam treatment is limited to the use of a conventional steaming step to improve the impregnation of liquors, in terms of P-factors this means a range of from 0 to 10 units.

According to the present disclosure, the CCE-step e) is performed directly after oxygen delignification as this will reduce or eliminate the need for addition of fresh alkali in the oxygen step as is otherwise always the case in pulp mills. Furthermore, this order of performing the steps will provide a pure dissolving pulp and a high value alkaline stream of soluble xylan from the dewatering step f). However, a person skilled in the art will appreciate that the CCE-step e) may be placed elsewhere in the process and that the other parts of the pulp line may be operated in a traditional way.

One of the key aspects in the production of dissolving pulp is the adjustment of viscosity within a narrow span. Depolymerization of cellulose may be performed according to different methods known to the skilled person, such as; oxidative degradation, acid depolymerization and enzymatic depolymerization. It has surprisingly been found that by using a CCE-step, the resulting pulp is much more sensitive to depolymerization than an ordinary kraft pulp or a prehydrolysed treated kraft pulp. This provides good process economy due to savings in acid charge, retention time and/or energy cost (permitting lower temperature) without impairing the yield or the quality of the resulting pulp. The conditions in the CCE-step (e.g. temperature and alkali charge) determine the kinetics of the depolymerization.

The process as defined herein may be performed in the same vessel, such as a digester, when performing the cooking and and/or the impregnation of the wood based raw material, such as in the form of batch cooking. The process as defined herein may also be performed as continuous cooking.

As mentioned above, it is also possible to use the liquor produced in the dewatering step f) in a process for manufacturing pulp comprising a kraft process, wherein said liquor is added to the kraft cooking process in a way so that the alkali is consumed while keeping the liquor in the digester until the end of the cooking process and wherein the residual alkali concentration is from 5 to 15 g/l. Furthermore, at least 80% of the alkali needed for the digestion of the wood based raw material is obtained from the process as defined herein.

Other applications for dissolving pulp may be production of regenerated cellulose, as a raw material of cellulose derivatives such as carboxymethyl cellulose (CMC), methyl cellulose (MC), hydroxypropyl cellulose (HPC), hydroxyethyl cellulose (HEC), etc. specialty paper-related products such as filter paper.

The dissolving pulp may be used in the processes for manufacturing viscose or lyocell fibers. Suitable applications for the viscose, modal or lyocell fibres are textiles and non-woven products. Other products that can be produced using processes in which dissolving pulp is used as the raw material are cellophane, tire cord, and various acetate and other specialty products.

The xylan/lignin ratio in a liquor is the weight ratio between the two components in the liquor as determined using the analysis methods disclosed herein. Accordingly, the determination of xylan in either wood, pulp or liquor is performed according to SCAN test method SCAN-CM 71:09 and calculated to wood components according to J. Jansson (1974, Faserforschung and Textiltechnik, 25(9), 375). When the xylan content in a liquor is determined, the first part of the acid hydrolysis using 72% sulfuric acid is omitted.

The residual lignin content in a pulp is indicated by the kappa number which is determined by ISO 302:2004 as disclosed herein while the lignin content in a liquor is determined with UV-spectrophotometry at 280 nm using the extinction coefficient for kraft lignin from birch wood; 20.8 dm$^3$/g cm (Alén and Hartus, 1988, Cellulose Chemistry and Technology, 22(6), 613-618).

The present disclosure also relates to a pulp obtainable from the process as disclosed herein, said pulp having a kink of from 1.3 to 2.0 kinks/mm and a shape factor of from 70 to 82%. Additionally, the pulp obtainable from the process may have a cellulose II content of from 7 to 50 weight % on cellulose, such as from 8 to 35 weight % and a LFAD of from 16 to 40 nm, such as from 17 to 25 nm. The curly fibers defined by the kink and shape factor results in a bulky pulp sheet that absorbs liquids in latter processes much more efficient than traditional pulp. Additionally, when the pulp is used in process using dry-defibration the energy required for the defibration of this pulp is substantially lower.

The present disclosure also relates to a pulp manufactured according to the process as defined hereinabove or hereinafter. Further, said pulp may have the values mentioned above.

BRIEF DESCRIPTION OF THE DRAWINGS

The processes disclosed herein will be described in more detail with reference to the appended drawings wherein.

DETAILED DESCRIPTION

Figure 1:
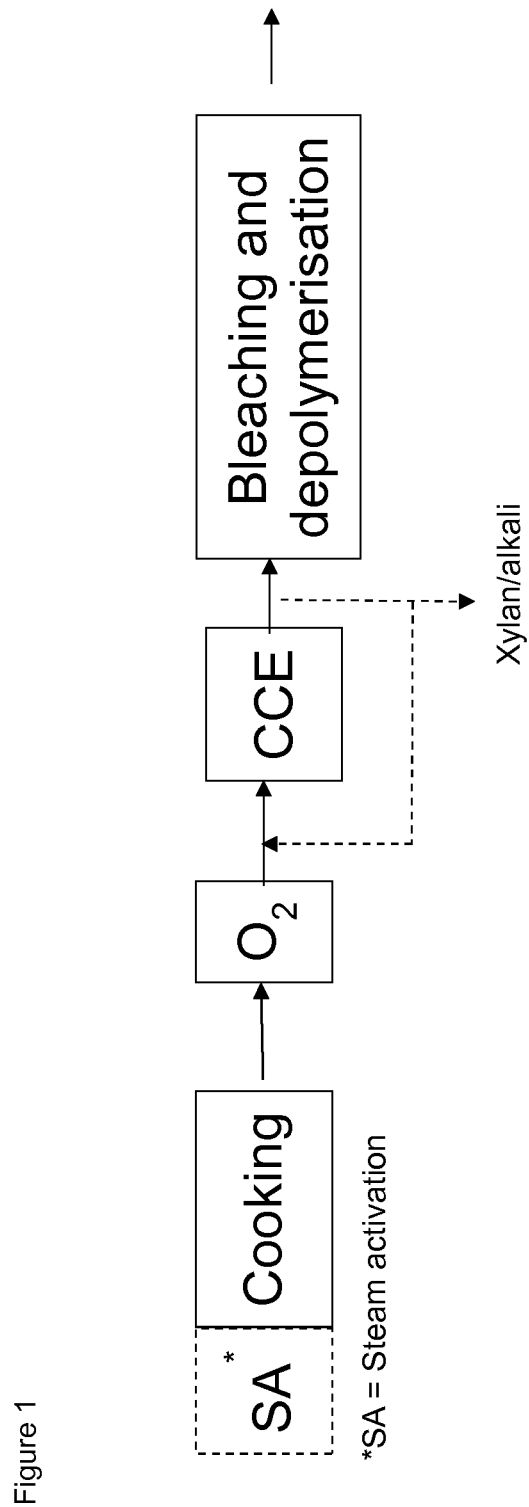
FIG. 1 shows a process diagram of a process as defined herein.

FIG. 1 schematically shows the process for manufacturing dissolving pulp as defined herein. The wood based raw material may be activated by performing a steam treatment on the wood based raw material and after the steam treatment white liquor may be added to the vessel and a traditional kraft cooking process may be performed. The kraft cooking process is followed by an oxygen delignifying step and a cold caustic extraction step (CCE-step). In the CCE-step, the oxygen delignified pulp is treated with alkali. The alkali source is industrial white liquor as set out herein. Suitable but not limiting parameters for the CCE-step are a temperature of from 30 to 50° C., a NaOH concentration of from 70 to 95 g/l and a time interval of from 15 to 30 minutes. The CCE-step will reduce the xylan content in the pulp to less than 6 weight % such as to from 6 weight % to 2 weight %. Accordingly, the process as defined herein comprises the steps of kraft cooking, oxygen delignification and cold caustic extraction followed by a washing step including an initial dewatering step performed directly after the CCE-step. A steam activation step may optionally be performed before the kraft cooking step. The process may comprise further steps such as depolymerisation and bleaching to desired viscosity and brightness level. The liquor removed from the pulp by the dewatering step coupled to the CCE-step has a high alkali and hemicellulose (xylan) concentration. As disclosed herein, the alkaline hemicellulose stream from the dewatering step may be recirculated and/or removed and used in other processes and applications.

Figure 2:
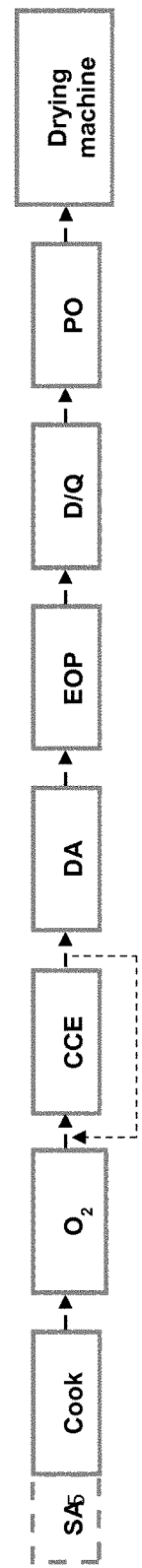
FIG. 2 shows a process diagram of a process for manufacturing dissolving pulp.

FIG. 2 is a schematical representation of a kraft process as defined herein, including an optional steam activation step. In the figures, each rectangle represents a process step, and any accompanying washing step.

In the depolymerisation step (DA), the pulp may be treated with sulfuric acid at a temperature of from 80 to 99° C. The effective amount of sulfuric acid may be from 5 to 20 kg/ADT and this step may be performed for 60 to 180 min. Before this treatment, the pulp may be treated with chlorine dioxide (D) which means that there will be chlorine dioxide present in the pulp. The obtained pulp has excellent properties, such as low viscosity, high brightness and a narrow molecular weight distribution.

The DA-step may be performed by using a chlorine dioxide charge in kg/ADT of 1.8 times the kappa number and a temperature of around 90° C. and an end pH of about 2.0. The DA-step may be performed during about 140 minutes.

The alkaline extraction step fortified with oxygen and hydrogen peroxide (EOP) may be performed according to the following, but not limiting, parameters: pH is about 10.4, $O_2$ is 4 kg/ADT, temperature is about 80° C.

The chlorine dioxide/complexing agent step (D/Q) may be performed according to the following, but not limiting, parameters: $MgSO_4$ 0.6 kg/ADT, EDTA 1 kg/ADT, temperature 80° C. and a pH of 4.5.

The pressurized hydrogen peroxide step (PO) may be performed according to the following, but not limiting, parameters: pulp consistency 10 weight %, end-pH 10.5-11.0, temperature 105° C., $O_2$ is 3 kg/ADT, residual $H_2O_2$ 3.0 kg/ADT and $MgSO_4$ 1.0 kg/ADT.

The drying of the pulp may be performed to a dry content of 90-93% and the pulp may be cut into sheets and stacked in bales.

Figure 3:
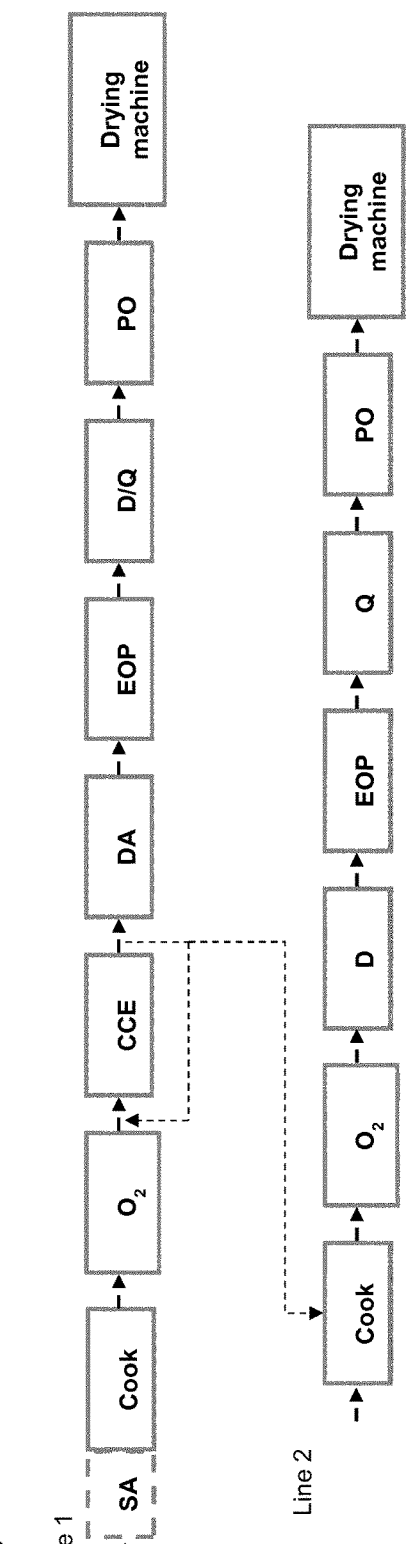
FIG. 3 shows a process diagram for a process for manufacturing pulp, comprising a linked process for manufacturing pulp.

FIG. 3 discloses the basic concept of a kraft process system according to the present disclosure, and including a parallel kraft pulping line in which the alkali and xylan containing liquor removed by the washing step after the CCE-step is used in the kraft cooking process. After the cooking step in which the alkali is consumed and the hemicellulose is precipitated onto the wood fiber the pulp may be bleached in a conventional way to a desired target brightness.

Figure 4:
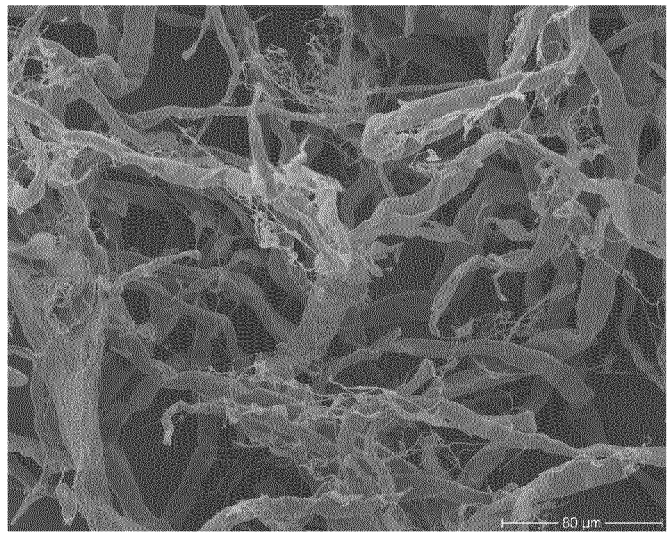
FIG. 4 shows the result after running samples of dissolving pulp obtained from the process as defined herein.
Figure 4:
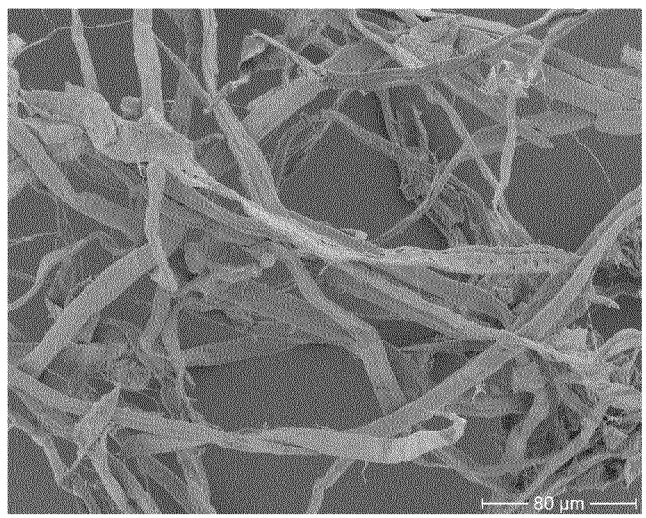

FIG. 4 shows that the dissolved pulp as manufactured according to the present disclosure has a higher degree of fibrillation than the reference sample pulp manufactured using a conventional method.

ABBREVIATIONS mol/l mol/liter
$H_2SO_4$ sulfuric acid
ADT air dried tons
EDTA ethylenediaminetetraacetic acid
$O_2$ oxygen
$Na_2CO_3$ sodium carbonate
NaHS sodium hydrosulfide
NaOH sodium hydroxide
Na+ sodium ion
HS$^-$ hydrosulfide ion
K+ potassium ion
OH$^-$ hydroxide ion
$CO_3^{2-}$ carbonate ion
$H_2O_2$ hydrogen peroxide
$MgSO_4$ magnesium sulfate
ml/g milliliter/gram
kinks/mm kink is defined as an abrupt change in the fiber curvature
D Chlorine dioxide
A Acid
Q Complexing agent
PO Pressurized hydrogen peroxide
EOP Alkaline extraction fortified with oxygen and hydrogen peroxide The present disclosure is further illustrated by the following non-limiting examples.

Example 1

Silver birch wood containing 25% xylan was cooked to pulp according to a Rapid Displacement Heating (RDH)-process to a kappa number of 17 in an industrial digester system. Cooking temperature was 160° C., the H-factor 350 and the residual alkali 10 g/l. After cooking, the pulp was screened before oxygen-delignification in a two-step industrial process. The temperature in the first reactor was 85° C. and 102° C. in the second reactor. The total alkali charge was 23 kg/ADT, total oxygen charge 15 kg/ADT and the magnesium sulfate charge was 3 kg/ADT. After the oxygen delignification, a pulp sample was taken out at the wash press and additionally washed in order to proceed with the pulp in the lab. The pulp had, after the oxygen delignification, a kappa number of 9.3, a brightness of 59.8% ISO and a viscosity of 1008 ml/g.

The pulp was then treated with industrial white liquor with high ionic strength at a consistency of 10%, effective alkali concentration of 95 g/l, at a temperature of 40° C. for minutes. The liquors and pulp were pre-heated to the process temperature before mixing and treated in plastic bags. After the treatment, the free liquor was pressed out and the pulp was subsequently washed with diluted filtrate at alkali concentrations of 13 g/l, 3 g/l and with water in a sequence in order to simulate an industrial washing sequence. The resulting pulp had a xylan content of 5.5 weight % and a $R_{18}$-value of 97.8%. The filtrate, which was pressed out directly after the CCE-treatment, had an effective alkali concentration of 83 g/l and a dissolved xylan concentration of 28.8 g/l.

The pulp, after the white liquor treatment, had a great potential as a dissolving pulp, however the viscosity and brightness needed to be adjusted. This was performed in a combined chlorine dioxide and acidic step. In an industrial process, it is important that the pH in the step does not drop too much below 2.0 as this increases the risk of severe corrosion on the equipment. Instead other parameters than the acidic charge were adjusted in order to meet the demands of a dissolving pulp. The DA-step was conducted at 95° C. at an active chlorine charge of 6.1 kg/ADT and a sulfuric acid charge of 10 kg/ADT. The residence time was 165 min and the treatment resulted in a pH of 1.9. After the DA-step, an extraction step was performed at 80° C., alkali charge of 5.5 kg/ADT and a hydrogen peroxide charge of 2 kg/ADT for 120 minutes. This resulted in a pulp with a brightness of 85.7% ISO and 390 ml/g in intrinsic viscosity.

The final step was a Q PO treatment with alkali charge of 20 kg/ADT and a hydrogen peroxide charge of 10 kg/ADT. The temperature was 110° C. and the residence time 150 minutes. The pulp was thereafter analyzed and a good dissolving pulp was obtained with a $R_{18}$-value of 97.6%, xylan content of 4.4 weight % and a viscosity of 383 ml/g.

The final pulp was also analyzed for other relevant parameters and the results are shown in Table 1. The metal ion content is an important property for a dissolving pulp and this content is very low and a reason for this is the acidic treatment at a pH of approximately 2 in the combined DA-step, which protonises the pulp acids and therefore lowers the metal ion content.

TABLE 1

Characterization of the pulp after the different treatments

|  | $O_2$ | CCE | DA EOP | Q PO |
|---|---|---|---|---|
| Viscosity, ml/g | 1008 | 997 | 389 | 383 |
| Brightness, % ISO | 59.8 | 67.3 | 85.7 | 92.3 |
| Kappa number | 9.3 | 3.4 | — | — |
| $R_{18}$, % | — | 97.8 | — | 97.6 |
| $R_{10}$, % | — | — | — | 94.7 |
| xylan, % | 23.6 | 5.5 | — | 4.4 |

TABLE 1-continued

Characterization of the pulp after the different treatments

|  | O$_2$ | CCE | DA EOP | Q PO |
|---|---|---|---|---|
| Ash content, % | — | — | — | 0.12 |
| Acetone extractives, % | — | — | — | 0.13 |
| Fe, ppm | — | — | — | 1.5 |
| Mn, ppm | — | — | — | <0.1 |
| Mg, ppm | — | — | — | 26 |
| Si, ppm | — | — | — | 20 |
| Ca, ppm | — | — | — | 22 |
| Ni, ppm | — | — | — | 0.1 |
| Cu, ppm | — | — | — | 0.2 |

Example 2 Mill Process

In this example a kraft mill using 4 batch digesters at 325 m$^3$ each was used. The raw material comprised of 93% Silver birch and 7% of other hardwoods, mainly aspen. The wood chips were steamed to a P-factor of 100 and the activation was terminated with the addition of white liquor to the bottom of the digester, immediately followed by a white and black liquor mixture until a cooking liquor:wood based raw material ratio of 3.7:1 was reached. The cooking step was performed with liquor circulation at 160° C. until a H-factor of 400 was reached. Typical properties of the pulp after the digestion was; viscosity: 1100 ml/g, brightness: 45% ISO, kappa number: 13.

The oxygen delignification was performed in a two-step reactor, using a total oxygen charge of 23 kg/ADT, without any additional charge of alkali. A charge of 1 kg MgSO$_4$/ADT was used to minimize the degradation reactions. The temperature in the two steps was 86° C. for 30 min and 105° C. for additional 60 min. After this treatment, the properties of the pulp were: brightness: 56% ISO, kappa number: 9.

Since the wood was activated using steam, the alkali charge in the CCE-step could be lowered. White liquor was charged so that a concentration of effective alkali was 85 g/l at a temperature of 45° C. for 20 minutes. The resulting pulp slurry was dewatered in a press before dilution and treatment in two wash presses and one wash filter in a sequence. After washing the properties of the pulp were: viscosity: 770 ml/g, brightness: 61.9% ISO.

The filtrate after the press was analyzed and the xylan content was 24.3 g/l, lignin content was 4.6 g/l resulting in a xylan/lignin ratio of 5.3:1. The weight average molecular weight of xylan was determined to 30.0 kg/mol, corresponding to a degree of polymerization of 227.

Since the pulp still contained some hydrosulfide ions after washing, chlorine dioxide was charged first and then just after, sulfuric acid was charged. The DA-step was performed in a small up-flow tower coupled with a larger down-flow tower. The temperature was 91° C., chlorine dioxide charge was 21 kg/ADT and sulfuric acid charge was 24 kg/ADT. About 9 kg of the sulfuric acid charge was used for neutralization and the rest was used as active charge. After washing, the pulp was treated in an extractions step at 80° C., 4 kg O$_2$/ADT, 2 kg H$_2$O$_2$/ADT and an alkali charge to reach a final pH of 10.4. The properties of the pulp after these treatments were; viscosity: 420 ml/g, brightness: 86% ISO.

To reach the target brightness, the pulp was treated in a Q PO sequence. The chelating step was performed with 0.5 kg/ADT of EDTA with 0.6 kg/ADT of magnesium sulfate at a temperature of 80° C. After washing, the PO-step was conducted with 10 kg of H$_2$O$_2$/ADT, kg NaOH/ADT, 1 kg MgSO$_4$/ADT and 3 kg O$_2$/ADT. The temperature in the bottom of the reactor was 95° C. After this final treatment, the pulp was dried in a drying machine to a dry content above 90% as set out above, cut into sheets and stacked in bales.

TABLE 2

Characterization of the pulp after the different treatments in the mill.

|  | Cook | DA EOP | Q PO |
|---|---|---|---|
| Viscosity, ml/g | 1100 | 418 | 422 |
| Brightness, % ISO | 45.1 | 86.3 | 91.5 |
| Kappa number | 13.2 | 0.9 | 0.9 |
| R$_{18}$, % | 92.1 | 96.3 | 96.8 |
| R$_{10}$, % | 88.7 | 92.7 | 93.4 |
| xylan, % | 15.8 | 5.0 | 4.1 |
| Ash content, % | 0.85 | 0.12 | 0.06 |
| Acetone extractives, % | 0.86 | 0.16 | 0.26 |
| Fe, ppm | 2.1 | 1.0 | 1.0 |
| Mn, ppm | 27 | <0.5 | <0.5 |
| Mg, ppm | 68 | 56 | 77 |
| Si, ppm | 17 | 11 | 6 |
| Ca, ppm | 950 | 66 | 38 |
| Cu, ppm | <0.5 | <0.5 | <0.5 |

Example 3 Comparison with Commercial Dissolving Pulps

Different commercial pulps (paper pulps and dissolving pulps) were collected and analysed using L&W FiberTester and CP-MAS $^{13}$C NMR spectroscopy [Wollboldt et al. 2010 (Wood Sci. Technol. 44:533-546)]. The uniqueness of the dissolving pulp produced using the method as defined herein is illustrated in the measured data as shown in Tables 3 and 4 below.

TABLE 3

Data from analyses of fibre dimensions with L&W Fiber Tester and WRV-measurements.

| Pulp | Kinks (kinks/mm) | Shape factor (%) | WRV (g/g) |
|---|---|---|---|
| Comm. Birch paper KP[1] | 0.530 | 90.5 | 1.22 |
| Comm. Eucalypt paper KP[2] | 0.614 | 91.1 | 1.10 |
| Birch DP Example 2[3] (P = 0) | 1.542 | 78.3 | 0.98 |
| Birch DP Example 2[3] (P = 100) | 1.510 | 79.5 | 0.90 |
| Comm. PHK eucalypt[4] | 1.076 | 87.2 | 0.95 |
| Comm. sulphite beech[5] | 1.266 | 83.9 | 0.80 |

[1]Birch paper kraft pulp
[2]Eucalypt paper kraft pulp
[3]Birch dissolving pulp prepared according to Example 2
[4]Commercial prehydrolysis kraft eucalypt dissolving pulp
[5]Commercial beech sulphite dissolving pulp

TABLE 4

Data from analyses with CP-MAS $^{13}$C NMR spectroscopy.

| Pulp | Fibril width (nm) | Lateral fibril aggregate dimension (nm) | Cellulose II (%) | Crystallinity index (%) |
|---|---|---|---|---|
| Comm. Birch paper KP[1] | 4.4 | 15.3 | 4.2 | 54.5 |
| Birch DP Example 2[2] (P = 0) | 4.9 | 22.7 | 17.8 | 59.0 |

TABLE 4-continued

Data from analyses with CP-MAS $^{13}$C NMR spectroscopy.

| Pulp | Fibril width (nm) | Lateral fibril aggregate dimension (nm) | Cellulose II (%) | Crystallinity index (%) |
|---|---|---|---|---|
| Birch DP Example 2[2] (P = 100) | 5.2 | 18.1 | 8.8 | 60.7 |
| Comm. PHK eucalypt[3] | 4.7 | 14.3 | 0.2 | 61.1 |
| Comm. Sulphite beech[4] | 4.7 | 14.3 | 6.7 | 57.3 |

[1]Birch paper kraft pulp
[2]Birch dissolving pulp prepared according to Example 2
[3]Commercial prehydrolysis kraft eucalypt dissolving pulp
[4]Commercial beech sulphite dissolving pulp As is evident from Table 3, a main difference between the dissolving pulp produced according to the method as defined herein and the commercial dissolving pulps, is the high kink value and the low shape factor of the pulp produced according to the invention. Furthermore, from Table 4 it is evident that pulps which have been produced according to the present method have elevated contents of cellulose II as a result of the high alkali charge in the CCE-step and that the lateral fibril aggregate dimensions are significantly larger than for the commercial pulps analysed.

In order to obtain comparative values e.g. when measuring LFAD in pulp by using NMR, it is important that the analyzed pulps are dried to the same extent. All tested commercial pulps were therefore dried in a drying machine to a dry content above 90%.

Example 4

FE-SEM

After coating with a thin layer of Au/Pd, the pulp samples were examined by high-resolution scanning electron microscopy at a 350 magnification with a Hitachi S4000 SEM (FE-SEM) applying an acceleration voltage of 6 kV. For preservation of the surface structure of moist pulps, the method of rapid freezing in liquid $N_2$ and normal freeze-drying described by Okamoto and Meshitsuka, 2010 (Cellulose 17:1171-1182) was applied.

The result of the SEM analysis is shown in FIG. 4. FIG. 4 shows that the dissolving pulp fibers made according to the process of the invention are curly and have a high kink as measured by image analysis as disclosed herein. The curly pulp fibers may be formed into bulky pulp sheets that absorb liquid easily and are easy to disintegrate in a dry state.

The invention claimed is:

1. A process for manufacturing dissolving pulp comprising the steps of:
   a) selecting a wood based raw material, said wood based raw material having a xylan content of from 12 weight % or more;
   b) adding a cooking liquor comprising white and/or black liquor to the wood based raw material;
   c) digesting the wood based raw material composition obtained from step b) in a kraft cooking process;
   d) oxygen delignifying the pulp obtained from step c);
   e) adding industrial white liquor comprising $Na_2CO_3$, NaHS and NaOH to the pulp obtained from step d) wherein said pulp has a xylan content of 8 weight % or more and wherein the temperature is lowered and kept from 50° C. to 65° C. from 5 minutes to 15 minutes and wherein the alkali concentration in the liquid phase of the obtained pulp suspension is in the range of 70 g/l to 100 g/l; and
   f) removing a major part of the alkali and dissolved xylan as a liquor flow from the pulp obtained from step e) by directly dewatering the pulp without dilution, wherein the removed liquor flow has the same xylan and alkali content as the liquid phase in step e); and
   g) after step f) subjecting the dewatered pulp to washing and pressing in a washing press device 1-5 times.

2. The process according to claim 1, wherein said white liquor added in step e) has a suspended solids content of 20 mg/l or less.

3. The process according to claim 1, wherein said white liquor has a combined $Na^+$ and $K^+$ concentration of from 3 to 5 mol/l, OH concentration of from 2.25 to 3.5 mol/l, HS$^-$ concentration of from 0.2 to 1.0 mol/l, and a $CO_3^{2-}$ concentration of from 0.10 to 0.60 mol/l.

4. The process according to claim 1, wherein the pulp obtained from step g) is filtered in a wash filter.

5. The process according to claim 1, wherein the temperature in step e) is 60° C. or lower.

6. The process according to claim 1, wherein the alkali concentration in step e) is in the range of from 85 to 100 g/l.

7. The process according to claim 1, wherein said process comprises a washing step between step d) and step e), said washing step comprising washing the pulp obtained from step d) in a washing device.

8. The process according to claim 1, wherein xylan and alkali removed in step f) are recirculated as a liquor flow and used as an alkali source in step e) and/or wherein xylan and alkali are removed as a liquor flow and used as an alkali/xylan source in another process for manufacturing pulp.

9. The process according to claim 1, wherein xylan and alkali removed in step f) are recirculated as a liquor flow and used as an alkali source in step d).

10. The process according to claim 9, wherein said liquor flow is oxidized before being used in step d).

11. The process according to claim 8, wherein the alkali concentration of said liquor flow is in the range of from 60 to 90 g/l without any supplementary addition of alkali.

12. The process according to claim 11, wherein said liquor flow is used as an alkali source in another process for manufacturing pulp.

13. The process according to claim 1, wherein said process comprises a step before step b), which step comprises activation of the wood based raw material by using steam until a P-factor of from 25 to 200 has been reached.

14. The process according to claim 1, wherein said process comprises a step after step g), which step is a combined depolymerization and bleaching step.

15. The process according to claim 14, wherein said combined depolymerization and bleaching step is performed by adding ozone, or by adding hypochlorite or by adding chlorine dioxide and sulfuric acid.

16. The process according to claim 14, wherein said combined depolymerization and bleaching step is performed at a temperature of from 80 to 99° C. and at an effective acid charge of from 5 to 20 kg $H_2SO_4$/air dried tons.

17. The process according to claim 14, wherein the obtained pulp after the combined bleaching and depolymerization step comprises 6 weight % or less xylan.

18. The process according to claim 1, wherein 90% or more of the alkali and dissolved xylan is removed from the pulp obtained from step e) after steps f) and g) are both performed.

* * * * *